United States Patent [19]

Zakaria et al.

[11] 4,285,897

[45] Aug. 25, 1981

[54] WATER-BASED ANTI-BLEMISH PAINT

[75] Inventors: Moneeb Zakaria, LaGrange; Manuel Slovinsky, Woodridge, both of Ill.

[73] Assignee: Nalco Chemical Company, Oak Brook, Ill.

[21] Appl. No.: 155,904

[22] Filed: Jun. 2, 1980

Related U.S. Application Data

[60] Division of Ser. No. 2,484, Jan. 11, 1979, Pat. No. 4,253,994, which is a continuation-in-part of Ser. No. 894,779, Apr. 10, 1978, abandoned, which is a continuation-in-part of Ser. No. 732,260, Oct. 14, 1976, abandoned.

[51] Int. Cl.$^3$ ............... B29H 21/04; B29H 5/02; C08L 9/10
[52] U.S. Cl. ............... 264/130; 152/330 R; 156/110 R; 156/289; 260/5; 427/393.5
[58] Field of Search ............ 152/330 R, 330 L, 353; 156/110 R, 123 R, 289; 427/393.5, 133, 135; 264/130, 134; 106/206; 260/3.5, 5, 8, 17 R, 17.4 R, 17.4 BB, 17.4 ST, 29.7 E, 29.7 M, 23 S, 23.7 A

[56] References Cited

U.S. PATENT DOCUMENTS

| | | | |
|---|---|---|---|
| 3,595,950 | 7/1971 | Mezynski | 264/130 |
| 4,014,843 | 3/1977 | Xanthopoulo | 260/29.7 T |
| 4,043,924 | 8/1977 | Traver | 252/21 |
| 4,072,645 | 2/1978 | Cogley, Jr. | 260/29.7 M |
| 4,092,279 | 5/1978 | Piskoti | 156/110 R |

*Primary Examiner*—John E. Kittle
*Assistant Examiner*—Lois E. Boland
*Attorney, Agent, or Firm*—John G. Premo; Robert A. Miller

[57] ABSTRACT

Water-based anti-blemish paints useful for coating the outside of tires prior to final shaping and curing is disclosed.

Typical compositions have the following formula:

| Ingredients | % By Weight |
|---|---|
| Water | 65–85 |
| Surfactant | 0.1–2 |
| Carbon Black | 10–25 |
| Particulate Lubricant | 1–8 |
| Elastomer Latex | 2–10 |

3 Claims, No Drawings

WATER-BASED ANTI-BLEMISH PAINT

This application is a division of Ser. No. 002,484 filed Jan. 11, 1979, now U.S. Pat. No. 4,253,994, which in turn is a Continuation-In-Part of co-pending application Ser. No. 894,779 filed Apr. 10, 1978, now abandoned, which in turn is a Continuation-In-Part of co-pending application Ser. No. 732,260 filed Oct. 14, 1976 and now abandoned.

INTRODUCTION

Anti-blemish paint is a product used in the tire industry and is applied (sprayed) on either the sidewall area or the entire outside of the green (uncured) tire before it is placed into the tire mold for cure. The main function of the product is to act as an air venting medium for entrapped air during the tire curing process and to ease mold release. Anti-blemish paint provides the following advantages in the tire production:
1. Venting trapped air during shaping and curing;
2. Healing defects in the tire building and allowing folds to flatten;
3. Lubrication and slip during tire shaping and mold release.

The most important of these advantages is the venting of trapped air. Trapped air is a major cause of tire defects. If air is trapped between the wall of the tire and the mold during curing and shaping, an air bubble blemish is cured into the tire. The air bubble appears as a depression in the tire sidewall.

Currently, all the anti-blemish paint products used in the tire industry are based on low flash hydrocarbon solvents containing 5–10% solids. These solids are mostly unpelleted carbon black, a curable film forming synthetic rubber as binder and may have additives to give better aging characteristics.

Recently, however, objections have been raised by OSHA (Occupational Safety and Health Act) against these solvent base products due to the hazardous atmosphere created during spraying, thus causing labor problems relating to handling low flash, high volume solvent products. In addition to health, fire hazards are also created with the conventional prior art products.

As mentioned above, the anti-blemish paint formulations that are currently in the market are composed of 5–10% suspension of carbon black in a low boiling hydrocarbon solvent. Upon spraying this product on the outside of the uncured tire, the solvent evaporates fast, thus leaving an even, thin film of carbon black on the surface that becomes tightly bound to the rubber by special additives after curing. Therefore, two important criteria must be considered in reformulating such a product to water base:
a. The drying time must be short—10–15 minutes;
b. An effective binding system must be added to ensure good adhesion of the carbon particles to the rubber stock.

THE INVENTION

Typical water-based anti-blemish paints coming within the scope of the invention have the following general formula:

| Ingredients | % By Weight |
| --- | --- |
| Water | 65–85 |
| Surfactant | 0.1–2 |
| Carbon Black | 10–25.0 |
| Particulate Lubricant | 1–8 |
| Elastomer Latex | 2–10 |

The Surfactant

The surfactant is, preferably, a nonionic surfactant although certain cationic and anionic surfactants may be used.

Examples of suitable cationic surfactants are salts of long-chain primary, secondary or tertiary amines such as oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts such as cetylpyridinium bromide, hexadecyl ethyl morpholinium chloride and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amides with 5 or more ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethylene glycol dibehenate, polyhydric alcohol partial higher fatty acid esters such as sorbitan tristearate, ethylene oxide condensation products of polyhydric alcohol partial higher fatty esters and their inner anhydrides (mannitolanhydride, called Mannitan), pentaerythritolmonooleate reacted with 12 molecules of ethylene oxide, sorbitan monostearate reacted with 10–15 molecules of ethylene oxide; long-chain polyglycols in which 1 hydroxyl group is esterified with a higher fatty acid and the other hydroxyl group is etherified with a low molecular weight alcohol such as methoxypolyethylene glycol 550 monostearate (550 meaning the average molecular weight of the polyglycol ether). A combination of two or more of these surfactants may be used.

A particularly useful nonionic surfactant is nonylphenol reacted with 9 moles of ethylene oxide.

The Carbon Black

Any grade of carbon black of the type used as a rubber filler may be employed in the practice of the invention. To aid in keeping this material in aqueous suspension, it is desirable that the carbon black have a relatively small particle size, e.g. 25–150 millimicrons. Particle sizes of 50–100 millimicrons are preferred.

The Particulate Lubricant

This particular component of the composition is most preferably zinc stearate although other bivalent metallic salts of $C_{12}$–$C_{22}$ fatty acids may be used. For instance, the calcium, magnesium or zinc salts of stearic acid, linoleic acid, tall oil fatty acids and the like may be used.

The Elastomeric Latexes

This component of the formula may be an aqueous latex which contains from about 15 up to about 80% by weight and preferably 30 to about 70% by weight of natural or synthetic rubber particles. Rubbers as used in this application can be defined using ASTM Standard, ASTM-D1566-62T, found in the 1964 book of ASTM Standards, Part 28, pp. 801. This defines rubber as "a material that is capable of recovery from large deformations quickly and forcibly and can be or already is, modified to a state in which it is essentially insoluble (but can swell) in boiling solvents such as benzene, methyl ethyl ketone and the ethanol-toluene azeotrope. A rubber in its modified state, free of diluents, retracts within one minute to less than 1.5 times its original length after being stretched at room temperature (20°-27° C.) to twice its length and held for one minute before release". The above definition includes materials which are both natural and synthetic in origin.

In the formulation of the coatings of this invention, natural and/or synthetic rubber latexes may be utilized. Thus, the coating compositions of the instant invention may contain as the elastomeric latex material a natural rubber latex, a synthetic rubber latex or combinations of the two.

As detailed above, the formulations of this invention can be made utilizing aqueous latices of synthetic or natural rubbers or combinations of the two. While certain synthetics can add both binding ability and oxidation resistance to the anti-blemish paint formulations, it is generally preferred to use as the elastomeric latex component of our anti-blemish paint compositions all or principally all natural rubber latex. This is due to the fact that the natural rubber latex exhibits superior bonding characteristics with most tire rubbers and in addition is relatively easy to formulate into the anti-blemish paint compositions of this invention.

When synthetic materials are utilized they should be chosen based on several considerations. First, they must be compatible or miscible with the rubber utilized to form the tire to which the coating compositions of this invention are applied. Secondly, the materials should be able to be formulated into a free flowing liquid coating composition which will not readily settle. As illustrative, synthetic materials that would qualify for use in this invention include neoprene (polychloroprene), styrene-butadiene rubbers (SBR), acrylonitrile-butadiene rubbers (NBR), high molecular weight olefin polymers with or without other additional monomers such as butyl rubber and cis and trans polybutadienes.

The latices of either natural or synthetic rubbers which we prefer to utilize in this invention do not contain carbon black, anti-oxidants, curing agents or other ingredients. Latices of these types, of both synthetic and natural rubbers, are available from a variety of domestic suppliers and those skilled in the art will be readily familiar with the sources and properties of these types of materials.

With further regard to synthetic materials, these materials are more fully set out in Volume 7, pp. 676-716 of the Kirk-Othmer *Encyclopedia of Chemical Technology*, 1966. With regard to the natural rubbers utilized in this invention, these are generally more fully set out in Volume 17, pp. 660-682 of the Kirk-Othmer *Encyclopedia of Chemical Technology*, 1966. Both of these encyclopedia articles are hereinafter incorporated by reference into this specification.

While as indicated above the elastomeric latex which is employed in this invention should contain from 15-85% and preferably 15-70% by weight of natural or synthetic rubber, the amount of rubber as such in the anti-blemish paint formula of this invention should generally range from 0.3-8% by weight and more preferably from 1-15%. As will be further seen, the amount of elastomer latex present in the actual formulation can vary from 2-10% by weight.

In the preparation of our anti-blemish paint formulation, the weight ratio of carbon black to the natural or synthetic rubber contained in the latex should be considered. We have found through experimentation that the preferred materials have a weight ratio of carbon black to natural or synthetic rubber contained in the elastomeric latex of from 6.5:1 to 7.5:1. Sufficient latex should however, always be present to bind the carbon black in our formulations.

As discussed earlier, anti-blemish paint formulations which are currently utilized are often composed of 5-10% suspensions of carbon black in a low boiling hydrocarbon solvent. When the hydrocarbon solvent is substituted with water, as in the instant invention, the drying time becomes much longer especially when anti-blemish paint formulations of low solids content are formed. Therefore, a much higher solids content, 45-50%, was used in the earlier stages of development of our water-based paints. A wetting agent is needed to facilitate the dispersion of carbon black particles in water, e.g. nonionic or anionic surfactants. In order to ensure a smooth film that is well bound to the tire rubber stock, a binder system was used to reduce or eliminate any loose carbon on the surface after curing, known as "chalk." To ensure good slip between the tire surface and the mold during curing and shaping, a lubricant such as zinc stearate was also included. Thus, our initial formulation of the product was as follows:

| | |
|---|---|
| Water | 54.48% |
| Nonionic Surfactant | 1.50 |
| Carbon Black | 33.00 |
| Zinc Stearate | 4.30 |
| Natural Rubber (68% Solids) | 5.04 |
| Neoprene 400 (49% Solids) | 1.68 |
| (Polychloroprene Latex Available from E. I. duPont de Nemours & Co.) | 100.00% |

Preliminary testing of the product showed the following defects:

1. On application of the paint at 40 wet grams per tire, the cured surface was too "chalky," i.e. too much loose carbon on the surface. This defect could be corrected by increasing the binder content in the formula.
2. At application rates of less than 40 wet grams per tire, the spray nozzle got plugged.
3. The paint on the tire was such that one cannot detect its presence after cure, thus cure operators will assume it has not been sprayed and returned it for another spray.

The first defect above was solved by increasing the amount of binder and decreasing the carbon black content in the formula. This will also help solve the nozzle plugging problem.

Thus, by increasing the binder system by 10%, then decreasing the total solids by 50%, the next formula was as follows:

| | |
|---|---|
| Water | 77.08% |
| Nonyl Phenol Reacted With 9 Moles Ethylene Oxide | 0.75 |
| Carbon Black (70 Millimicrons) | 16.50 |
| Zinc Stearate (Dispersion Grade) | 2.15 |
| Natural Rubber Latex (68% Solids) | 2.64 |
| Neoprene 400 (49% Solids) (polychloroprene Latex Available from E. I. duPont de Nemours & Co.) | 0.88 |
| | 100.00% |

This formula was successfully tried in a field trial and the results showed that all the previous defects have been corrected, e.g., 1. The drying time of the sprayed tire was quite good; 10–15 minutes.
2. No evidence of "chalkiness" on the dried tire was observed.
3. The dried tire did have an "off black" color that is essential to distinguish it from the unsprayed tire, thus eliminating the need for an extra additive to achieve this purpose.
4. Most important, no blemishes were present on the tire after cure, indicating proper venting and air bleed during curing.
5. No plugging of the spray nozzles.

It is important to note that a spray rate of 30.0 g/tire appears to be optimum, since at such a rate no defects were found on the cured tires with the preferred formulation. It is reasonable to assume that for each formulation there is an optimum amount to be applied per tire. The example was performed on a line producing bias belted tires.

An inherent property of this type of product is that the solids settle upon standing for a few days. This is understood and accepted by the tire manufacturers and as a result the product always goes through mild agitation process immediately before or even during pumping to the sprayer. Our product has shown excellent redispersibility upon mild agitation after a storage period of four months.

Formulas of the above type are applied to the external wall of tires before their final shaping and curing. The purpose of the paint is to permit the flow of air from the outside surface of the tire as it is compressed and heated against the metal wall of the mold for shaping and curing. If air is trapped between the outside wall of the tire and the mold, an air bubble blemish is cured into the tire which appears as a depression in the tire sidewall. Other imperfections may come from lack of lubrication causing the displacement of the tire wall on the metal in the curing wall not to be smooth.

The amount of coating applied to the tire may be varied although, as a general rule, the amount applied would correspond to that amount applied when the raw tire prior to formation would be given a thin coating with a paint brush. The compositions are normally applied by spraying using paint spray type equipment.

EXAMPLE I

A composition would be formulated containing the following ingredients:

| | % By Weight |
|---|---|
| (1) Water | 77.8 |
| (2) Nonyl phenol reacted with 9 moles of ethylene oxide | 0.75 |
| (3) Carbon black 70 millimicrons | 16.5 |
| (4) Zinc stearate (dispersion grade) | 2.15 |
| (5) Natural rubber latex (68% solids) | 3.52 |

This formula would be applied to the side walls of tires prior to curing the tire. Results would show that the drying time of the sprayed tire would be in the range of 10–15 minutes with no evidence of chalkiness on the cured tire would be observed. The cured tire would have an off-black color which would distinguish it from the unsprayed tires and a significant decrease in blemishes present on the tire after curing would be observable. In addition, no plugging of spray nozzles or paint equipment would occur.

EXAMPLE II

An anti-blemish paint formulation was prepared as follows:

77.08 parts water were blended with 0.75 parts Triton ® X-114 nonyl phenol surfactant. To this mixture was then added 16.50 parts of carbon black, 2.15 parts of zinc stearate and 3.52 parts of elastomer latex.

In this example, the above formula was used with a variety of elastomer latexes. These latexes, type rubber, and percentage or rubber in the latex are listed below in Table I.

TABLE I

| Trial | Type Rubber | Supplier | Trade Designation | % Solids in Latex | % Solids in Anti-Blemish Paint Formulation |
|---|---|---|---|---|---|
| 1 | Modified natural rubber | Imperial Adhesives and Chemicals Inc. | 233 | 62 | 21.6 |
| 2 | Modified natural rubber | Imperial Adhesives and Chemicals Inc. | 028-21 | 53 | 21.3 |
| 3 | Nitrile rubber | B. F. Goodrich | Hycar 1552 | 53 | 21.3 |
| 4 | Nitrile rubber | B. F. Goodrich | Hycar 1562 | 41 | 20.8 |
| 5 | Butadiene-acrylonitrile-styrene rubber | B. F. Goodrich | Hycar 1577 | 40 | 20.8 |
| 6 | Nitrile rubber | B. F. Goodrich | AP 1229 | 33 | 20.6 |
| 7 | Carboxylated rubber | B. F. Goodrich | AP 1230 | 25 | 20.3 |
| 8 | Poly(isobutylene-isoprene) rubber | Exxon | Butyl latex 100 | 40 | 20.8 |

The above formulations would be used as an anti-blemish paint for the coating of tires prior to curing. The materials would be sprayed onto the tire prior to curing at an approximate level of 30.0 grams per tire. After curing the tire with the above compositions, there would be no evidence of chalkiness on the dry tire. The dry tire would have an off-black color distinguishing it from untreated tires, and no blemishes would be present on the tire after curing indicating the existence of proper venting and air bleed during curing.

Having thus described our invention, it is claimed as follows:

1. A method for preventing blemishes formed during the manufacture of tires which comprises coating the outside of tires prior to shaping and curing with a thin coating of an anti-blemish paint composition which comprises:

| Ingredients | % By Weight |
| --- | --- |
| Water | 65–85 |
| Surfactant | 0.1–2 |
| Carbon black | 10–25 |
| Particulate lubricant | 1–8 |
| Aqueous latex containing 15–80% by weight of particles selected from the group consisting of natural rubber, synthetic rubber and mixtures thereof | 2–10 |

2. The method of claim 1 wherein the anti-blemish paint composition comprises:

| Ingredients | % By Weight |
| --- | --- |
| Water | 77.08 |
| Nonyl phenol reacted with 9 moles of ethylene oxide | 0.75 |
| Carbon black (70 millimicrons) | 16.50 |
| Zinc stearate | 2.15 |
| Natural rubber latex (68% solids) | 2.64 |
| Polychloroprene latex (49% solids) | 0.88 |

3. A method for preventing blemishes formed during the manufacture of tires which comprises coating the outside of tires prior to shaping and curing with a thin coating of an anti-blemish paint composition which comprises:

| Ingredients | % By Weight |
| --- | --- |
| Water | 65–85 |
| Surfactant | 0.1–2 |
| Carbon black | 10–25 |
| Particulate lubricant | 1–8 |
| An aqueous latex of natural rubber particles containing 15–80% by weight natural rubber particles | 2–10 |

* * * * *